(12) United States Patent  (10) Patent No.: US 8,156,605 B2
Dietrich et al.  (45) Date of Patent: Apr. 17, 2012

(54) DRIVE DEVICE

(75) Inventors: Jan Dietrich, Buehl (DE); Achim Hawighorst, Buehlertal (DE)

(73) Assignee: Robert Bosch GmbH, Stuttgart (DE)

( * ) Notice: Subject to any disclaimer, the term of this patent is extended or adjusted under 35 U.S.C. 154(b) by 962 days.

(21) Appl. No.: 12/158,804

(22) PCT Filed: Nov. 8, 2006

(86) PCT No.: PCT/EP2006/068203

§ 371 (c)(1),
(2), (4) Date: Jun. 23, 2008

(87) PCT Pub. No.: WO2007/079994

PCT Pub. Date: Jul. 19, 2007

(65) Prior Publication Data

US 2009/0025172 A1   Jan. 29, 2009

(30) Foreign Application Priority Data

Dec. 28, 2005  (DE) .......................... 10 2005 062 721

(51) Int. Cl.
*B60S 1/06*  (2006.01)
*B60S 1/18*  (2006.01)
*B60S 1/26*  (2006.01)
*B60S 1/16*  (2006.01)

(52) U.S. Cl. ................. 15/250.31; 15/250.3; 15/250.16; 15/250.17; 188/77 R; 188/77 W

(58) Field of Classification Search ............... 15/250.25, 15/250.3, 250.31, 250.15, 250.16, 250.17; 188/77 W, 77 R See application file for complete search history.

(56) References Cited

U.S. PATENT DOCUMENTS

| 1,382,205 | A | * | 6/1921 | Lewis | 15/250.15 |
| 2,744,282 | A | * | 5/1956 | Dyer et al. | 15/250.3 |
| 3,016,753 | A | * | 1/1962 | Ziegler | 74/89.2 |
| 3,649,988 | A | * | 3/1972 | Mellor | 15/250.3 |
| 3,685,622 | A | * | 8/1972 | Baer et al. | 192/35 |
| 3,966,024 | A | * | 6/1976 | Baer | 188/71.2 |
| 5,287,949 | A | * | 2/1994 | Kitamura | 188/77 W |
| 5,386,165 | A | * | 1/1995 | Bruhn et al. | 310/75 R |
| 5,441,227 | A | * | 8/1995 | Hayashi | 248/274.1 |

FOREIGN PATENT DOCUMENTS

| CN | 1586940 | 3/2005 |
| DE | 734423 | 4/1943 |
| FR | 1352696 | 2/1964 |
| FR | 2827241 | 1/2003 |

OTHER PUBLICATIONS

PCT/EP2006/068203 International Search Report.

* cited by examiner

*Primary Examiner* — Gary Graham
(74) *Attorney, Agent, or Firm* — Michael Best & Friedrich LLP

(57) ABSTRACT

The invention relates to a drive device (10), especially for a window wiping device, comprising at least one shaft (13). Until now, only stop mechanisms which are very complicated in terms of production are known, with which a wiper arm can be blocked in the idle position thereof. In order to reduce this complexity, the inventive drive device comprises a strip and/or a cord which can be wound around the at least one shaft (13) with a defined tension.

20 Claims, 2 Drawing Sheets

DRIVE DEVICE

BACKGROUND OF THE INVENTION

The invention relates to a drive device, in particular for a windshield wiping device, comprising at least one shaft.

In particular with drive devices which are directly connected to a wiper arm, which therefore operate without a linkage system, the wiper arm has to be able to be blocked in its park position, so that it is not able to be forced out of the park position by driving wind. The blocking devices previously known from the prior art are very complicated to produce and thus cost-intensive.

SUMMARY OF THE INVENTION

The object of the invention is to improve the aforementioned drive device such that the wiper arm may be blocked in its park position with lower production costs than before.

The invention solves the problem set forth with a drive device of the aforementioned type in which according to the invention a strip and/or a cord may be wound about the at least one shaft with a defined tension. Thus the strip and/or the cord generate a defined frictional force on the shaft which blocks the shaft and thus also the wiper arm in the park position thereof. This is a structurally very simple and thus cost-effective solution.

If the tension acting in the strip and/or in the cord may be altered, both the shaft and the wiper arm may be blocked by the strip and/or by the cord and the blocking may be released again.

The blocking is particularly simple to implement and effective when the strip and/or the cord is a coiled spring.

The spring may be compressed and/or forced apart. When the spring is compressed, it presses against the shaft, whereby a frictional force blocking the shaft is produced. When the spring is forced apart, then the frictional force is reduced between the spring and the shaft so that the blocking is again released.

The spring may be compressed and/or forced apart in a particularly elegant manner by means of an electrical magnetic field. Thus the spring may be compressed or forced apart as soon as an electric voltage is applied to an armature of a wiper motor. When the wiper motor is switched off, the spring again adopts its original shape as a result of the pretensioning thereof.

In order to be able to compress and/or force apart the spring, it may be able to be connected to a movable releasable element with one of its ends.

In a particularly simple embodiment, the release element may be of plate-shaped configuration.

When the plate-shaped release element is made from a magnetic material, in particular from a ferromagnetic material, the spring may be compressed or forced apart, as soon as an electric voltage is applied to the armature of the wiper motor.

In a similarly very simple embodiment, however, it is also possible to design the release element as a projection arranged on a gear wheel.

Advantageously, the at least one shaft may be an armature shaft, a shaft of a gear wheel or the like. Tests have shown that even low frictional forces between the spring and the armature shaft are sufficient to block the armature shaft and thus the wiper arm(s) cooperating with the armature shaft.

Preferably, the drive devices may have at least one wiper motor and/or at least one gear.

The advantages of the drive device according to the invention become particularly apparent in a drive device which is directly connected to at least one wiper arm, which thus has no linkage system between the wiper arm and the wiper motor.

Moreover, the invention relates to a windshield wiping device, in particular for a motor vehicle.

BRIEF DESCRIPTION OF THE DRAWINGS

Various embodiments of the drive device according to the invention are described in more detail hereinafter with reference to the accompanying drawings, in which in detail.

DETAILED DESCRIPTION

Figure 1:
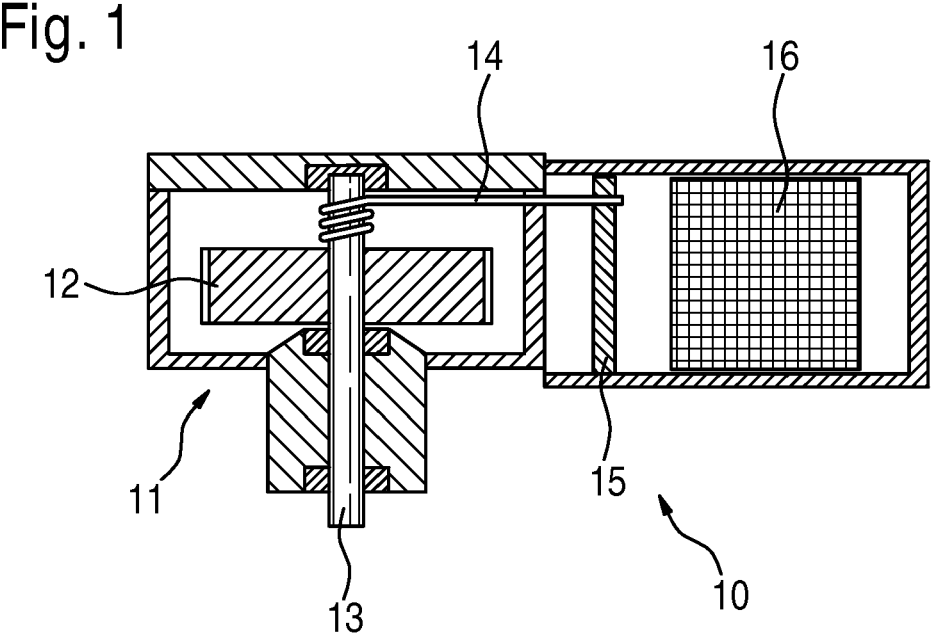
FIG. 1 shows a sectional view through a first embodiment of a drive device.

FIG. 1 shows a drive device 10 comprising a gear 11, which comprises a gear wheel 12. The gear wheel 12 is mounted on a shaft 13, about which a spring 14 is wound. The spring 14 generates a frictional force on the shaft 13, whereby the shaft 13 and thus also a wiper arm, not shown in more detail, cooperating with the shaft 13 may be blocked.

The spring 14 is connected to a plate-shaped release element 15. An electromagnet 16 is arranged opposite the plate-shaped release element 15. When an electric voltage is applied to the electromagnet 16, for example when switching on a windshield wiping device, then the release element 15 is either attracted by the electromagnet 16 or repelled by the electromagnet 16, whereby the spring 14 is forced apart, so that the frictional force between the spring 14 and the shaft 13 is reduced and thus the blocking is released. As soon as the windshield wiping device is again switched off and no more electric voltage is applied to the electromagnet 16, the spring 14 is compressed again, whereby the frictional force between the spring 14 and the shaft 13 increases and thus the shaft 13 and the wiper arm cooperating therewith is blocked.

Figure 2:
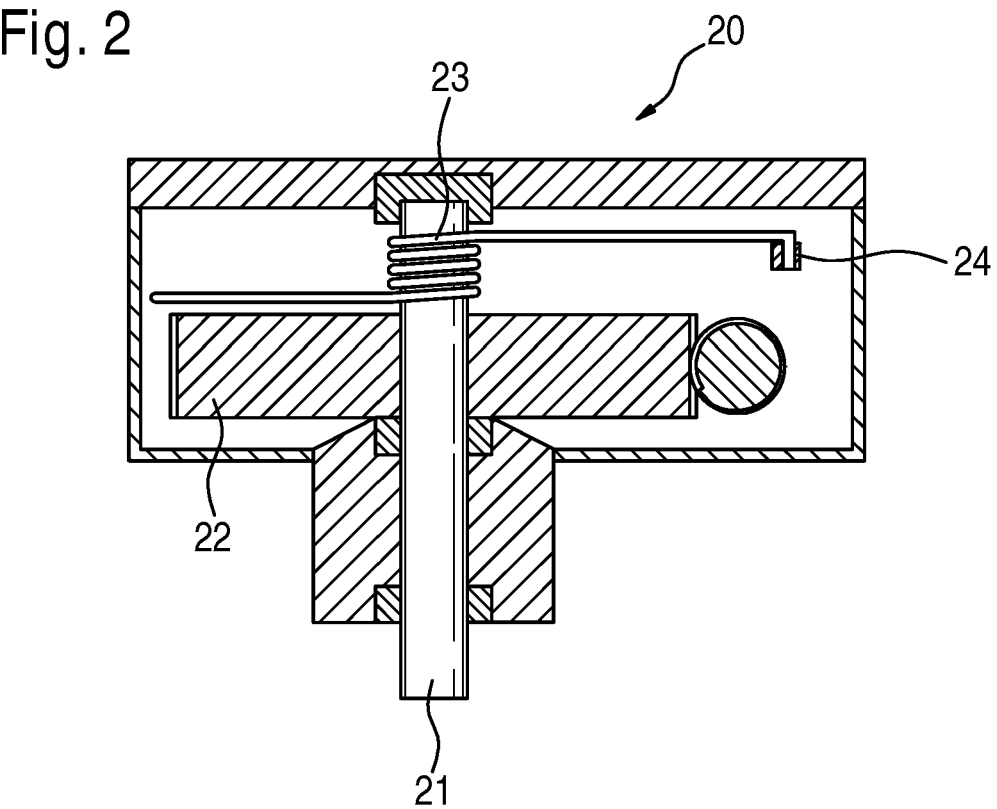
FIG. 2 shows a sectional view through a second embodiment of the drive device.

FIG. 2 shows a drive device 20 with a gear wheel 22 arranged on a shaft 21. A spring 23 is wound about the shaft 21, by means of which the shaft 21 and the wiper arm cooperating therewith may be releasably blocked.

A linkage system 24 is connected to the spring 23, by the actuation of which the spring 23 may be compressed or forced apart, in order to block the shaft 21 or in order to release the blocking.

Figure 3:
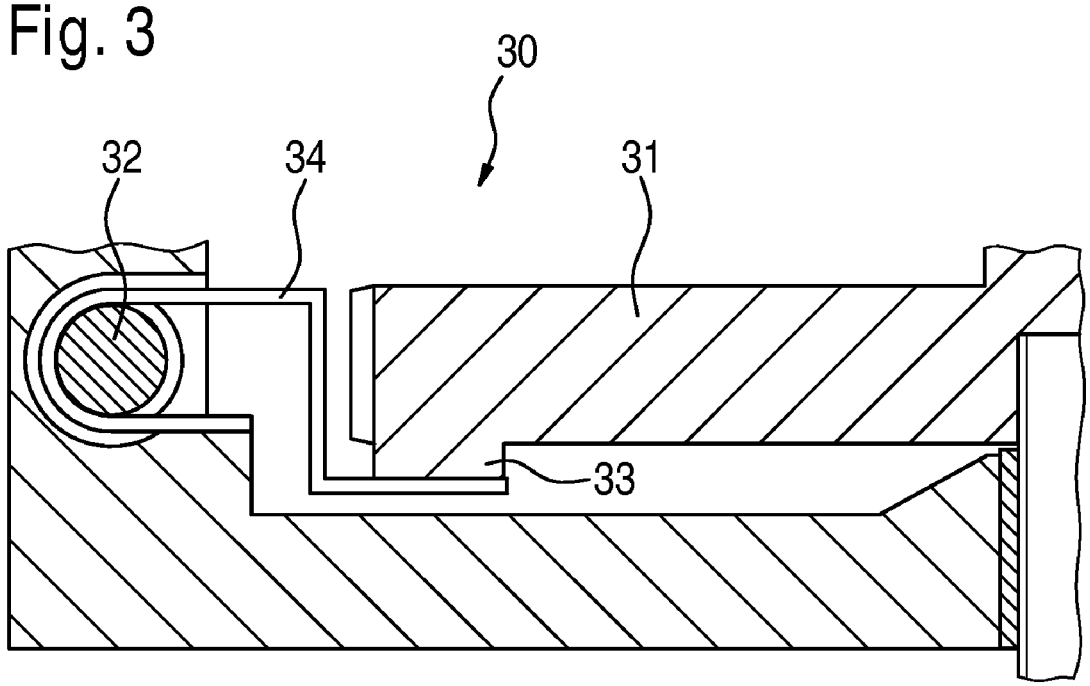
FIGS. 3 and 4 show a sectional view through a third embodiment of the drive device.
Figure 4:
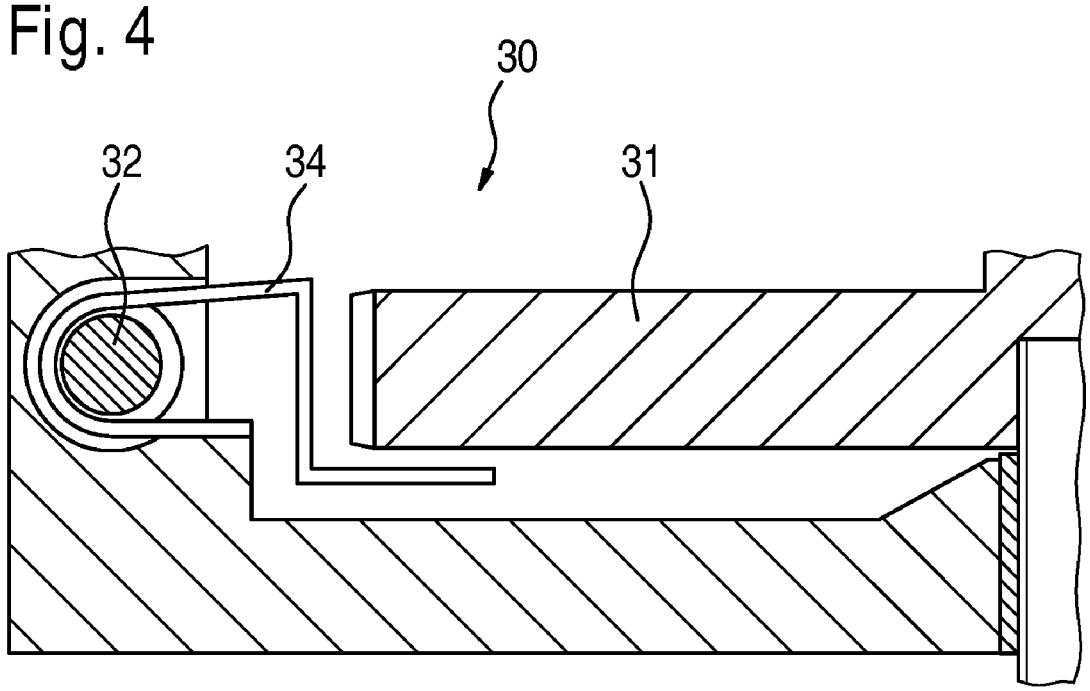

FIGS. 3 and 4 show a drive device 30 comprising a gear wheel 31 and a shaft 32, which for example may be the shaft of an armature of a wiper motor, not shown in more detail here.

The gear wheel 31 is provided with a projection 33 (see FIG. 3) by means of which a spring 34 wound about the shaft 32 may be compressed, in order to block the shaft 32. In order to compress the spring 34, the projection 33 is positioned onto the spring 34. As soon as the projection 33 no longer bears against the spring 34 (see FIG. 4), the spring 34 is again forced apart due to the pretension thereof, whereby the blocking is again released.

The invention claimed is:

1. A drive device (10, 20, 30) of a windshield wiping device, the drive device comprising a housing and at least one shaft (13, 21, 32) supported for pivoting movement relative to the housing, characterized in that one of a strip and a cord is wound about the at least one shaft (13, 21, 32) with a defined tension, the one of the strip and the cord having one end fixed relative to the housing and an opposite end, and in that an actuator engages the opposite end of the one of the strip and the cord, the actuator causing the one of the strip and the cord to move between a release condition, in which a force applied to the shaft by the one of the strip and the cord is reduced and the shaft is pivotable relative to the one of the strip and the cord, and a blocking condition, in which the force applied to the shaft by the one of the strip and the cord is increased to block pivoting movement of the shaft relative to the housing.

2. The drive device (10, 20, 30) as claimed in claim 1, characterized in that the tension acting in the one of the strip and the cord may be altered.

3. The drive device (10, 20, 30) as claimed in claim 1, characterized in that the one of the strip and the cord is a coiled spring (14, 23, 34).

4. The drive device (10, 20, 30) as claimed in claim 3, characterized in that the spring (14, 23, 34) is selectively compressed in the blocking condition and forced apart in the release condition.

5. The drive device (10) as claimed in claim 4, characterized in that the actuator includes an electrical magnetic field, the spring (14) being selectively compressed and forced apart by means of the electrical magnetic field.

6. The drive device (10, 30) as claimed in claim 3, characterized in that the actuator includes a movable release element (15), the release element being movable between a first position corresponding to the release condition of the spring and a second position corresponding to the blocking position of the spring.

7. The drive device (10) as claimed in claim 6, characterized in that the release element (15) is of plate-shaped configuration.

8. The drive device (10) as claimed in claim 7, characterized in that the plate-shaped release element (15) is made from a magnetic material and is moved by means of an electrical magnetic field.

9. The drive device (30) as claimed in claim 6, characterized in that the release element is a projection (33) arranged on a gear wheel, the projection engaging an end of the spring in the blocking condition, the projection being disengaged from the spring in the release condition.

10. The drive device (10, 20, 30) as claimed in claim 1, characterized in that the at least one shaft (13, 21, 32) is one of an armature shaft and a shaft of a gear wheel (12, 22).

11. The drive device (10, 20, 30) as claimed in claim 1, characterized in that the drive device (10, 20, 30) has one of at least one wiper motor and at least one gear.

12. The drive device (10, 20, 30) as claimed in claim 1, characterized in that the drive device is directly connected to at least one wiper arm.

13. A windshield wiping device, comprising a drive device (10, 20, 30) including a housing and at least one shaft (13, 21, 32) supported for pivoting movement relative to the housing, characterized in that one of a strip and a cord is wound about the at least one shaft (13, 21, 32) with a defined tension, the one of the strip and the cord having one end fixed relative to the housing and an opposite end, and in that an actuator engages the opposite end of the one of the strip and the cord, the actuator causing the one of the strip and the cord to move between a release condition, in which a force applied to the shaft by the one of the strip and the cord is reduced and the shaft is pivotable relative to the one of the strip and the cord, and a blocking condition, in which the force applied to the shaft by the one of the strip and the cord is increased to block pivoting movement of the shaft.

14. The device as claimed in claim 13, characterized in that the drive device (10, 20, 30) has one of at least one wiper motor and at least one gear.

15. The device as claimed in claim 13, characterized in that the drive device is directly connected to at least one wiper arm.

16. The device as claimed in claim 13, characterized in that the tension acting in the one of the strip and the cord may be altered.

17. The device as claimed in claim 13, characterized in that the one of the strip and the cord is a coiled spring (14, 23, 34).

18. The device as claimed in claim 17, characterized in that the spring (14, 23, 34) is selectively compressed in the blocking condition and forced apart in the release condition.

19. The device as claimed in claim 18, characterized in that the spring (14) is selectively compressed and forced apart by means of an electrical magnetic field.

20. The device as claimed in claim 17, characterized in that the spring (14, 34) is connected to a movable release element (15) with one of its ends, the release element being movable between a first position corresponding to the release condition of the spring and a second position corresponding to the blocking position of the spring.

* * * * *